United States Patent
Kida

(10) Patent No.: US 11,243,646 B2
(45) Date of Patent: Feb. 8, 2022

(54) DISPLAY DEVICE

(71) Applicant: SHARP KABUSHIKI KAISHA, Sakai (JP)

(72) Inventor: Kazutoshi Kida, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/950,329

(22) Filed: Nov. 17, 2020

(65) Prior Publication Data

US 2021/0173520 A1 Jun. 10, 2021

Related U.S. Application Data

(60) Provisional application No. 62/943,418, filed on Dec. 4, 2019.

(51) Int. Cl.
*G06F 3/044* (2006.01)

(52) U.S. Cl.
CPC .................................. *G06F 3/0445* (2019.05)

(58) Field of Classification Search
CPC ............... G09G 3/006; G09G 3/3225; G09G 2320/0242; G09G 2320/0626; G09G 2320/0666; G09G 2320/0673; G09G 2320/0693; G09G 3/3208; G06F 3/0445; G06F 3/0446; G06F 3/0447; G06F 3/0412; G06F 2203/04104; G06F 2203/04105; G06F 2203/04111; G06F 2203/04112; G06F 3/0414; G06F 3/044; G06F 3/04144

See application file for complete search history.

(56) References Cited

U.S. PATENT DOCUMENTS

| | | | |
|---|---|---|---|
| 2010/0056220 A1* | 3/2010 | Oh | G06F 1/1643 455/566 |
| 2016/0018922 A1 | 1/2016 | Wang et al. | |
| 2016/0187690 A1 | 6/2016 | Nam et al. | |
| 2017/0262131 A1* | 9/2017 | Maruyama | G06F 3/0446 |
| 2018/0024677 A1* | 1/2018 | Kim | G09G 3/3233 345/173 |
| 2018/0095582 A1* | 4/2018 | Hwang | H01L 27/3276 |
| 2019/0036208 A1* | 1/2019 | Yamagishi | G06F 3/04162 |

FOREIGN PATENT DOCUMENTS

| | | |
|---|---|---|
| JP | 2016-126336 A | 7/2016 |
| JP | 2017-504139 A | 2/2017 |
| WO | WO 2017/131128 * | 8/2017 |

* cited by examiner

*Primary Examiner* — Md Saiful A Siddiqui
(74) *Attorney, Agent, or Firm* — ScienBiziP, P.C.

(57) ABSTRACT

A display device displays an image and also detects a touch by a user. The display device includes a plurality of touch detection electrodes, a conductive member, and a floating electrode. The plurality of touch detection electrodes are disposed overlapping a display region in a plan view, and the conductive member is disposed in a position closer to a surface touched by the user than the plurality of touch detection electrodes. The floating electrode is disposed in a position closer to the surface touched by the user than the plurality of touch detection electrodes, and overlaps at least a part of each of the plurality of touch detection electrodes in the plan view.

4 Claims, 14 Drawing Sheets

DISPLAY DEVICE

CROSS-REFERENCE TO RELATED APPLICATIONS

This application claims the benefit of priority to U.S. Provisional Application No. 62/943,418 filed on Dec. 4, 2019. The entire contents of the above-identified application are hereby incorporated by reference.

BACKGROUND

Technical Field

The disclosure disclosed below relates to a display device including a touch detection function.

JP 2017-504139 A discloses a display device including an in-cell type touch panel in which a touch sensor is provided on an active matrix substrate. In the display device, a plurality of self-capacitance electrodes are provided on the active matrix substrate, one frame is divided into a display period and a touch period, and the self-capacitance electrodes are driven according to each of the display period and the touch period.

A display panel of a liquid crystal display device including the in-cell touch panel as described above includes a liquid crystal layer provided between an active matrix substrate and a counter substrate including a color filter and the like. Further, a set of polarizers is provided so as to sandwich the counter substrate and the active matrix substrate. In the related art, an aspect is often adopted where an image is visually recognized by a user from the counter substrate side, and a touch operation of the user is received on a surface on the counter substrate side. However, an aspect is also conceivably adopted where the display panel is disposed such that positions of the active matrix substrate and the counter substrate are reversed, an image being visually recognized by the user and a touch operation being received from the active matrix substrate side. In this case, a conductive member such as a data line is disposed in a position closer to a surface touched by the user than a touch detection electrode (common electrode). When a finger of the user or the like comes into contact, capacitive coupling occurs between the conductive member and the finger or the like, and thus capacitive coupling between the finger and the touch detection electrode is weakened.

Further, for example, in a display device including an out-cell type touch panel, an antenna layer provided with an antenna for performing near field wireless communication and the like may be provided on a touch panel provided with a touch detection electrode. When a surface of the display device on the antenna layer side is touched, capacitive coupling occurs between the antenna and a finger of a user or the like, and capacitive coupling between the touch detection electrode and the finger of the user or the like is weakened.

In this way, when the conductive member capacitively coupled to the finger of the user or the like is provided in a position closer to the surface touched by the user than the touch detection electrode, the capacitive coupling between the touch detection electrode and the finger of the user or the like is weakened, and the touch detection accuracy decreases.

The disclosure of the present application provides a display device including a touch detection function, in which the touch detection accuracy is less likely to decrease even when a conductive member is provided in a position closer to a surface touched by a user than a touch detection electrode.

SUMMARY

A display device that has been made in view of the problem described above is a display device configured to display an image and also detect a touch of a user, and includes: a plurality of touch detection electrodes disposed overlapping, in a plan view, a display region in which the image is displayed; a conductive member disposed in a position closer to a surface touched by the user than the plurality of touch detection electrodes; and a floating electrode that is disposed in a position closer to the surface touched by the user than the plurality of touch detection electrodes, overlaps at least a part of each of the plurality of touch detection electrodes in the plan view, and is disposed in a floating state.

According to the configuration described above, in a display device including a touch detection function, the touch detection accuracy is less likely to decrease even when a conductive member is provided in a position closer to a surface touched by a user than a touch detection electrode.

BRIEF DESCRIPTION OF DRAWINGS

The disclosure will be described with reference to the accompanying drawings, wherein like numbers reference like elements.

DESCRIPTION OF EMBODIMENTS

Hereinafter, embodiments of the disclosure will be described in detail with reference to the drawings. In the

First Embodiment

Figure 1:
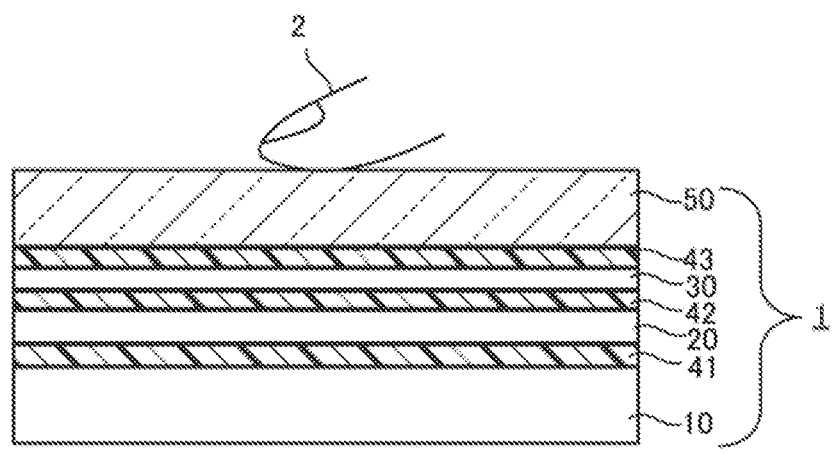
FIG. 1 is a schematic cross-sectional view illustrating a display device according to a first embodiment.

FIG. 1 is a schematic cross-sectional view illustrating a display device according to the present embodiment. A display device 1 according to the present embodiment includes an image display function, a touch detection function of detecting a touch by a finger 2 of a user or the like, and a near field wireless communication function. Hereinafter, a configuration of the display device 1 will be specifically described.

The display device 1 includes a display panel 10, a touch panel 20, an antenna layer 30, and a cover glass 50. The display panel 10 and the touch panel 20 adhere to each other with an optically clear adhesive (OCA) layer 41 therebetween. Further, the touch panel 20 and the antenna layer 30 adhere to each other with an OCA layer 42 therebetween, and the antenna layer 30 and the cover glass 50 adhere to each other with an OCA layer 43 therebetween. In other words, the display device 1 includes a so-called out-cell type touch panel in which the touch panel 20 is disposed on the display panel 10.

The display panel 10 is formed of a liquid crystal display, an organic EL display, or the like.

Although not illustrated in FIG. 1, the display device 1 includes a display control circuit for driving the display panel 10 and a touch panel controller for driving the touch panel 20.

The display device 1 displays an image on the display panel 10 under control of the display control circuit, and also detects, on the touch panel 20, a position in which the finger 2 of the user or the like contacts a surface of the cover glass 50 under control of the touch panel controller.

Figure 2:
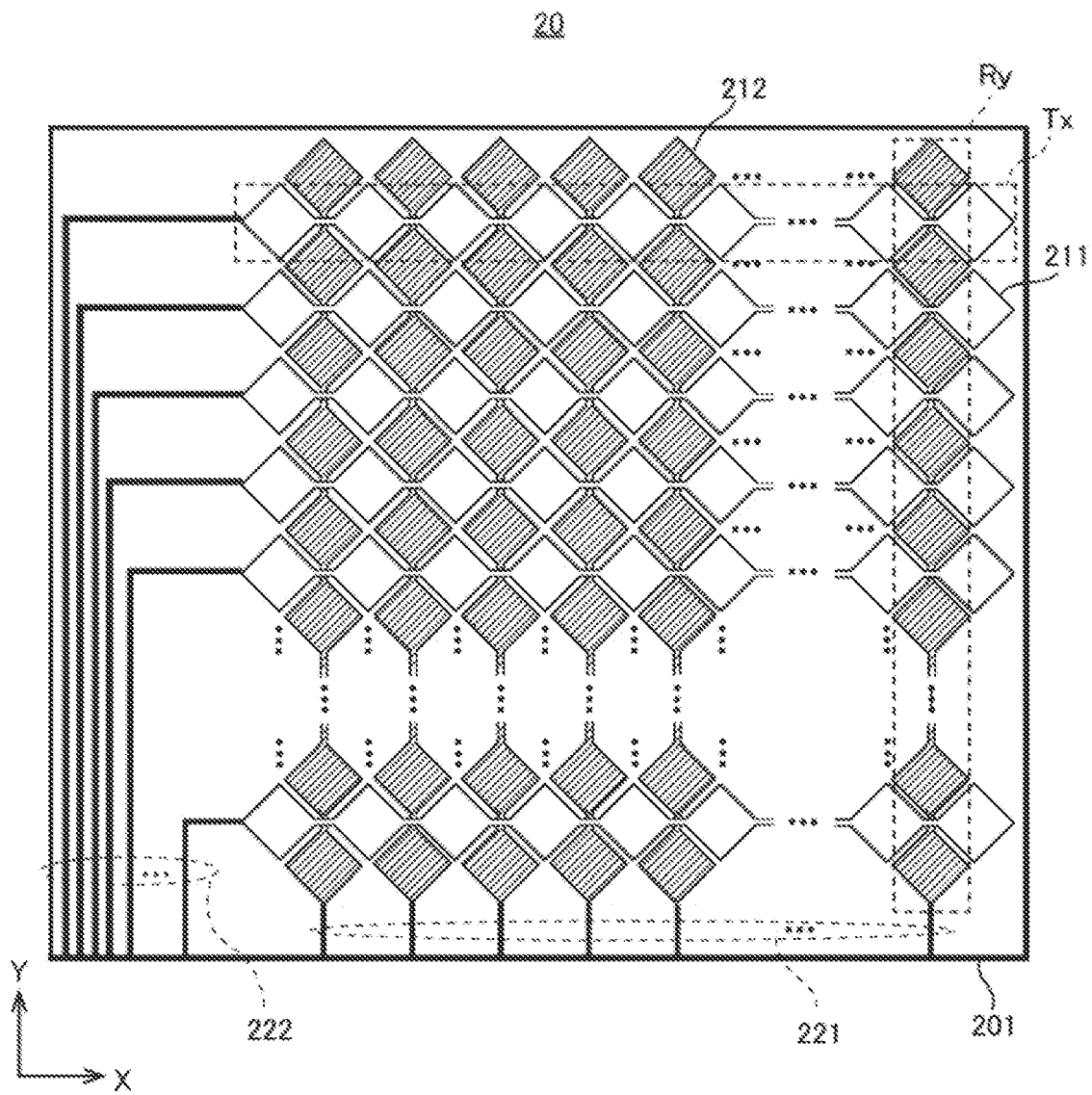
FIG. 2 is a plan view illustrating a schematic configuration of a touch panel.

FIG. 2 is a plan view illustrating a schematic configuration of the touch panel 20. As illustrated in FIG. 2, the touch panel 20 includes, on a base material 201 formed of an insulating material, a plurality of electrode patterns Tx, a plurality of electrode patterns Ry, a plurality of sense lines 221, and a plurality of drive lines 222. The plurality of sense lines 221 and the plurality of drive lines 222 are connected to the touch panel controller (not illustrated).

The electrode pattern Tx is formed of a plurality of electrodes 211 (not hatched) having a substantially diamond shape being arranged in an X direction on the base material 201, and the electrodes 211 adjacent to each other in the X direction being connected to each other. The electrode pattern Ry is formed of a plurality of electrodes 212 (hatched) having a substantially diamond shape being arranged in a Y direction on the base material 201, and the electrodes 212 adjacent to each other in the Y direction being connected to each other. The electrode pattern Tx and the electrode pattern Ry are formed of a transparent conductive material such as ITO.

The plurality of drive lines 222 are connected to the plurality of electrode patterns Tx. The plurality of sense lines 221 are connected to the plurality of electrode patterns Ry. The drive line 222 and the sense line 221 are formed of a metal material such as copper.

The touch panel controller (not illustrated) sequentially drives the electrode pattern Tx by applying a drive pulse to the drive line 222. An electrical field (capacitance) is formed between the electrode 211 in the electrode pattern Tx and the electrode 212 in the electrode pattern Ry. When a dielectric such as the finger 2 of the user (see FIG. 1) contacts the surface of the cover glass 50, the electrical field (capacitance) between the electrode 211 and the electrode 212 near the contact position changes. A sense signal according to the change in the electrical field (capacitance) is output to the touch panel controller (not illustrated) via the sense line 221. The touch panel controller detects a touch position according to the drive line 222 to which the drive pulse is applied and the sense line 221 from which the sense signal is output.

Figure 3:
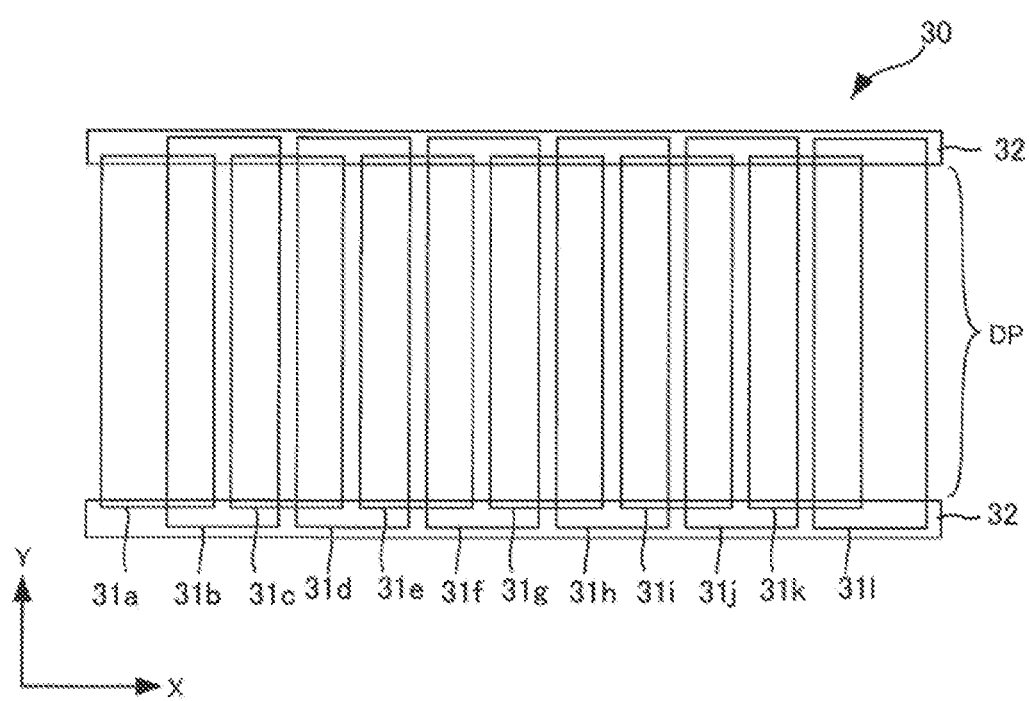
FIG. 3 is a plan view illustrating a schematic configuration of an antenna layer.

Next, the antenna layer 30 will be described. FIG. 3 is a plan view illustrating a schematic configuration of the antenna layer 30 according to the present embodiment.

The antenna layer 30 includes, on a base material such as a PET film, antenna patterns 31 (31a to 31l) arranged in the X direction and an FPC substrate 32 disposed on both ends of the base material in the Y direction. The antenna pattern 31 is used as an antenna for near field communication (NFC). Note that, in FIG. 3, the antenna pattern 31 is represented by a rectangle, but a region in which the antenna pattern 31 is disposed is merely schematically illustrated, and is different from an actual shape of the antenna pattern 31. In practice, the antenna pattern 31 is formed as an antenna coil having a loop shape or a spiral shape of two or more windings.

The antenna patterns 31a to 31l are arranged so as to overlap each other. In this example, for example, the antenna patterns 31 adjacent to each other in the X direction are disposed so as to overlap each other in positions shifted by a half pitch from each other. In other words, a center line parallel to the Y direction between the antenna pattern 31a and the antenna pattern 31c coincides with a center line parallel to the Y direction of the antenna pattern 31b. In the antenna pattern 31, adjacent antenna patterns and antenna lines do not intersect each other in a region DP overlapping a display region of the display panel 10.

In a portion of the antenna pattern 31 overlapping the FPC substrate 32 in a plan view, in a position that intersects the antenna line of the adjacent antenna pattern 31 in the plan view, either of the antenna patterns is wired in a layer different from that of the FPC substrate 32 through a contact hole (not illustrated) formed in the FPC substrate 32.

The antenna pattern 31 is connected to an antenna controller (not illustrated) via the FPC substrate 32. The antenna controller sequentially applies a drive signal to the antenna patterns 31a to 31l. When a near field communication (NFC) card is detected, the antenna patterns 31a to 31l are driven at a sine wave of 13.56 MHz, for example. Note that the method for driving the antenna pattern 31 may be a method other than this.

The antenna layer 30 is provided between the touch panel 20 and the cover glass 50. Thus, when the finger 2 contacts the surface of the cover glass 50 (see FIG. 1), capacitive coupling occurs between the finger 2 and the antenna layer 30, and capacitive coupling between the finger 2 and the electrode pattern Tx is reduced as compared to a case without the antenna layer 30. In this way, a sense signal indicating a capacitance change in the electrode patterns Ry and Tx is reduced, and the touch detection accuracy decreases.

Thus, the display device 1 according to the present embodiment has, in the antenna layer 30, a structure for increasing a coupling capacitance between the finger 2 and the electrode patterns Ry and Tx in order to suppress a decrease in the touch detection accuracy in the touch panel 20. Hereinafter, the structure will be specifically described.

Figure 4A:
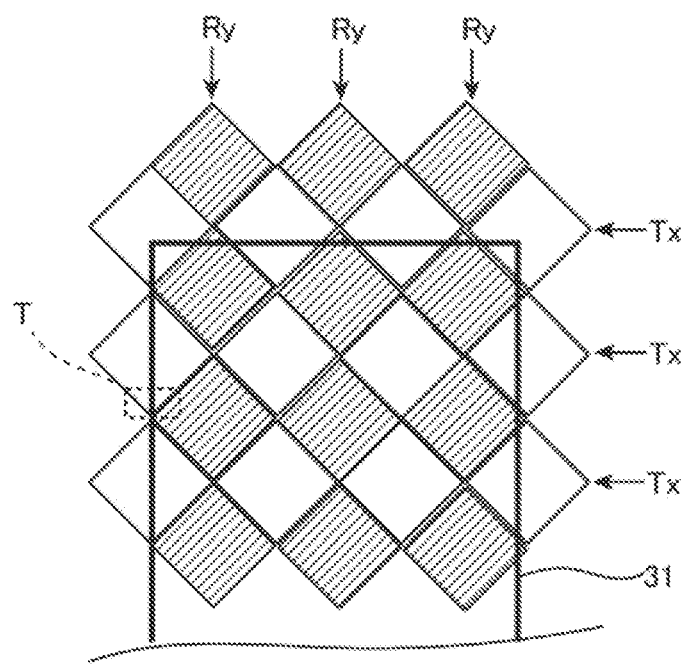
FIG. 4A is a schematic diagram illustrating a state where an electrode pattern being a part of the touch panel illustrated in FIG. 2 and a part of an antenna pattern illustrated in FIG. 3 overlap each other in a plan view.
Figure 4B:
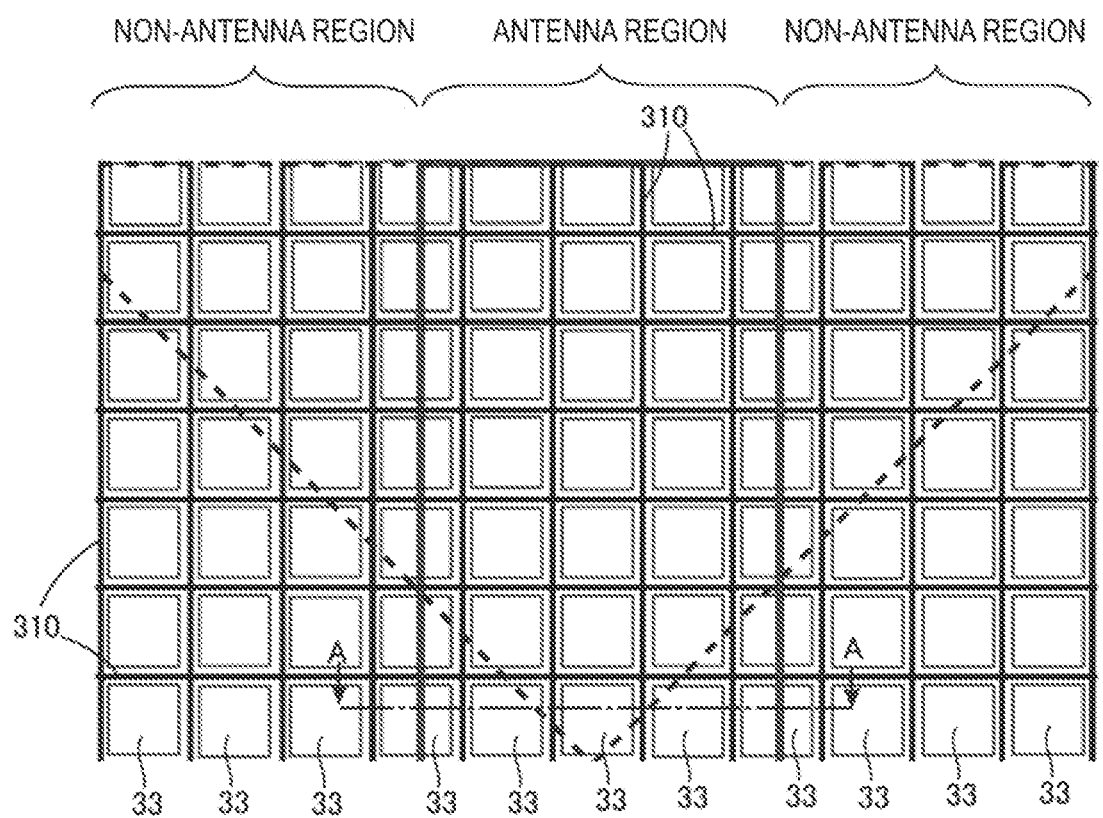
FIG. 4B is a schematic diagram illustrating a region of an antenna layer corresponding to a portion of a dashed frame T illustrated in FIG. 4A.
Figure 4C:
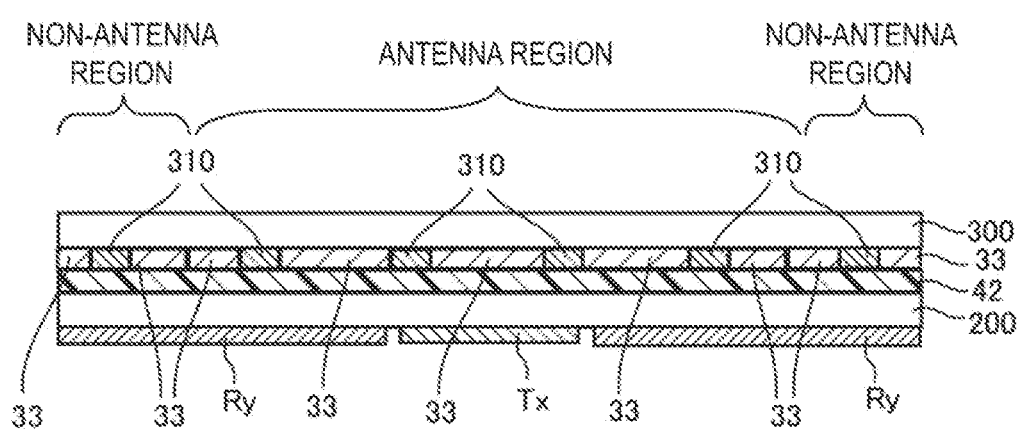
FIG. 4C is a schematic cross-sectional view taken along a line A-A illustrated in FIG. 4B.

FIG. 4A is a schematic diagram illustrating a state where the electrode patterns Ry and Tx being a part of the touch panel 20 and a part of the antenna pattern 31 overlap each other in the plan view. FIG. 4B is a schematic diagram illustrating a region of the antenna layer 30 corresponding to a portion of a dashed frame T illustrated in FIG. 4A. FIG. 4C is a schematic cross-sectional view taken along a line A-A in FIG. 4B.

The antenna pattern 31 is formed by cutting out a metal mesh formed of a metal fine line formed on one of the entire surfaces of a base material 300 (see FIG. 4C) into a predetermined pattern. In order to make the antenna pattern 31 less visually recognizable, a metal mesh 310 in an electrically floating state is left in a region other than the antenna pattern 31. In other words, as illustrated in FIG. 4B, the antenna layer 30 includes a metal mesh region (hereinafter, an antenna region) that constitutes the antenna pattern 31, and a metal mesh region (hereinafter, a non-antenna region) in a region other than the antenna pattern 31.

In the present embodiment, as illustrated in FIGS. 4B and 4C, a floating electrode 33 in an electrically floating state is provided in a mesh (gap) portion in the antenna region and the non-antenna region, i.e., a portion surrounded by the metal mesh 310. The floating electrode 33 is formed of a transparent conductive material such as ITO, for example. Note that, in FIG. 4C, the floating electrode 33 and the metal mesh 310 of the antenna pattern 31 contact each other, but in practice, the floating electrode 33 and the metal mesh 310 are provided with a gap therebetween and do not contact each other.

The floating electrode 33 is provided in the mesh portion of the metal mesh 310, and thus a capacitance is formed between the finger 2 and the floating electrode 33 when the finger 2 contacts the surface of the cover glass 50. Further, the floating electrode 33 is provided in the entire mesh portion of the metal mesh 310 that faces the electrode patterns Ry and Tx. In other words, the floating electrode 33 is provided, and thus the coupling capacitance between the finger 2 and the electrode pattern Tx increases. As a result, the sense signal indicating a capacitance change in the electrode patterns Ry and Tx near a contact position of the finger 2 is less likely to be reduced, and the touch detection accuracy improves.

Second Embodiment

Figure 5:
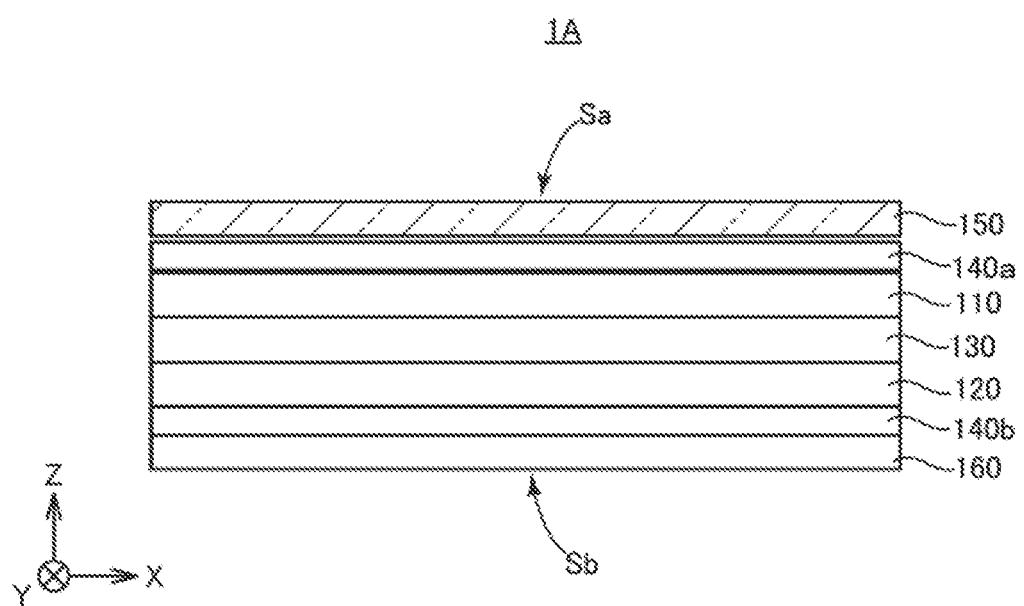
FIG. 5 is a schematic cross-sectional view illustrating a display device according to a second embodiment.

In the present embodiment, a display device different from that in the first embodiment will be described. FIG. 5 is a schematic cross-sectional view illustrating the display device according to the present embodiment. As illustrated in FIG. 5, a display device 1A includes, as a display panel, an active matrix substrate 110, a counter substrate 120, and a liquid crystal layer 130 sandwiched between the active matrix substrate 110 and the counter substrate 120. Further, a pair of polarizers 140a and 140b is provided so as to sandwich the active matrix substrate 110 and the counter substrate 120. Further, a cover glass 150 is provided on a surface of the polarizer 140a via an adhesive layer (not illustrated), and a backlight 160 is provided so as to face the polarizer 140b.

The backlight 160 includes, for example, a light source formed of an LED, a light guide plate, and an optical sheet (none are illustrated). The light source is provided in a position that does not overlap a display region of the display panel in a plan view. The light guide plate is formed of a transparent synthetic resin such as, for example, an acrylic resin and polycarbonate, and the like, and is provided in a position that overlaps the display region in the plan view. The optical sheet includes a diffuser sheet that diffuses light and is formed of a substantially transparent synthetic resin and the like, and the like, and is provided between the display panel and the light guide plate.

The display device 1A includes a first mode in which a user visually recognizes an image from a surface (hereinafter, a first surface) Sa side of the cover glass 150 provided on the polarizer 140a side, and a touch operation is received on the first surface Sa, and a second mode in which the user visually recognizes an image from a surface (hereinafter, a second surface) Sb side on the backlight 160 side, and a touch operation is received on the second surface Sb. The display device 1A inverts a left-right orientation of the image in the first mode and the second mode, and displays the image. Hereinafter, when a surface (first surface and second surface) touched by the user is not distinguished, the surface is simply referred to as a touch surface.

The display device 1A includes, similarly to the first embodiment, an image display function and a touch detection function. In the present embodiment, a driving method of liquid crystal molecules included in the liquid crystal layer 130 is a transverse electrical field driving method. In order to achieve the transverse electrical field driving method, a pixel electrode and a counter electrode (common electrode) for forming an electrical field are formed on the active matrix substrate 110. Further, an element needed for detecting a touch position is provided on the active matrix substrate 110. The display device 1A is a display device including a so-called in-cell type touch panel.

Figure 6:
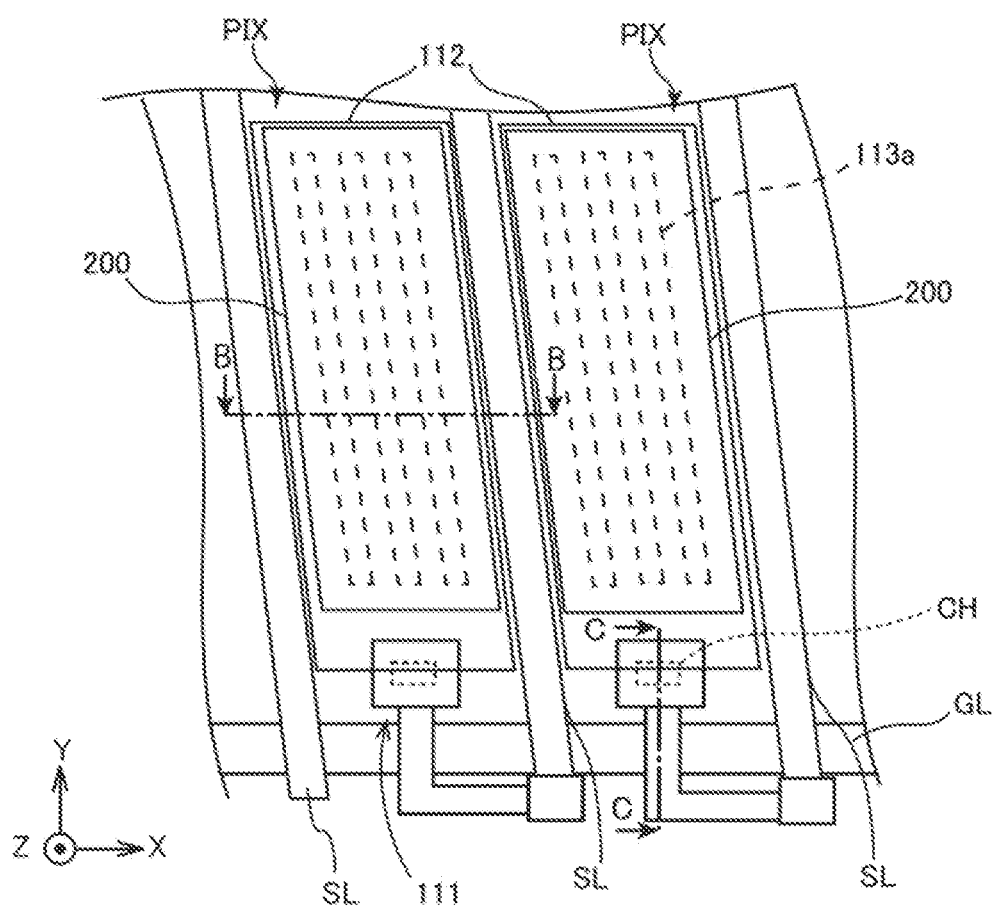
FIG. 6 is a plan view illustrating a schematic configuration of an active matrix substrate illustrated in FIG. 5.
Figure 7:
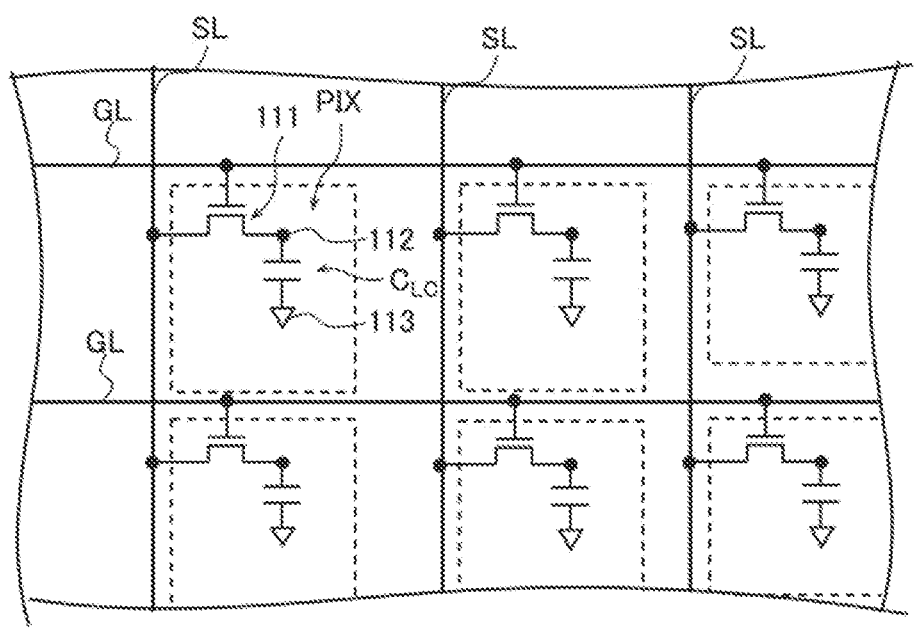
FIG. 7 is an equivalent circuit diagram of a pixel in the active matrix substrate.

FIG. 6 is a plan view illustrating a schematic configuration of the active matrix substrate 110. Further, FIG. 7 is an equivalent circuit diagram of a pixel in the active matrix substrate 110.

The active matrix substrate 110 includes a plurality of gate lines GL and a plurality of data lines SL that intersect the plurality of gate lines GL. The active matrix substrate 110 has a display region constituted by a plurality of pixels PIX defined by the plurality of data lines SL and the plurality of gate lines GL.

As illustrated in FIG. 6, a switching element 111, a pixel electrode 112, and a floating electrode 200 are provided in the pixel PIX.

The switching element 111 is formed of, for example, a thin film transistor (TFT). A gate of the TFT 111 is connected to the gate line GL, a source is connected to the data line SL, and a drain is connected to the pixel electrode 112. The TFT 111 in the present embodiment has a top gate structure in which a semiconductor layer is formed in a layer closer to a substrate 100 (see FIG. 9A) of the active matrix substrate 110 than the gate.

The pixel electrode 112 is formed of a transparent conductive film such as ITO.

The floating electrode 200 is provided between the data line SL and the data line SL adjacent to each other so as to overlap the pixel electrode 112 in the plan view, and has a smaller dimension than the pixel electrode 112. Details of the floating electrode 200 will be described later.

Although not illustrated in the drawing, a counter electrode 113, which will be described later, is disposed so as to overlap the pixel electrode 112 in the plan view, and a slit 113a of the counter electrode 113 for forming a transverse electrical field between the pixel electrode 112 and the slit 113a is provided in a position that overlaps the pixel electrode 112 in the plan view.

Figure 8:
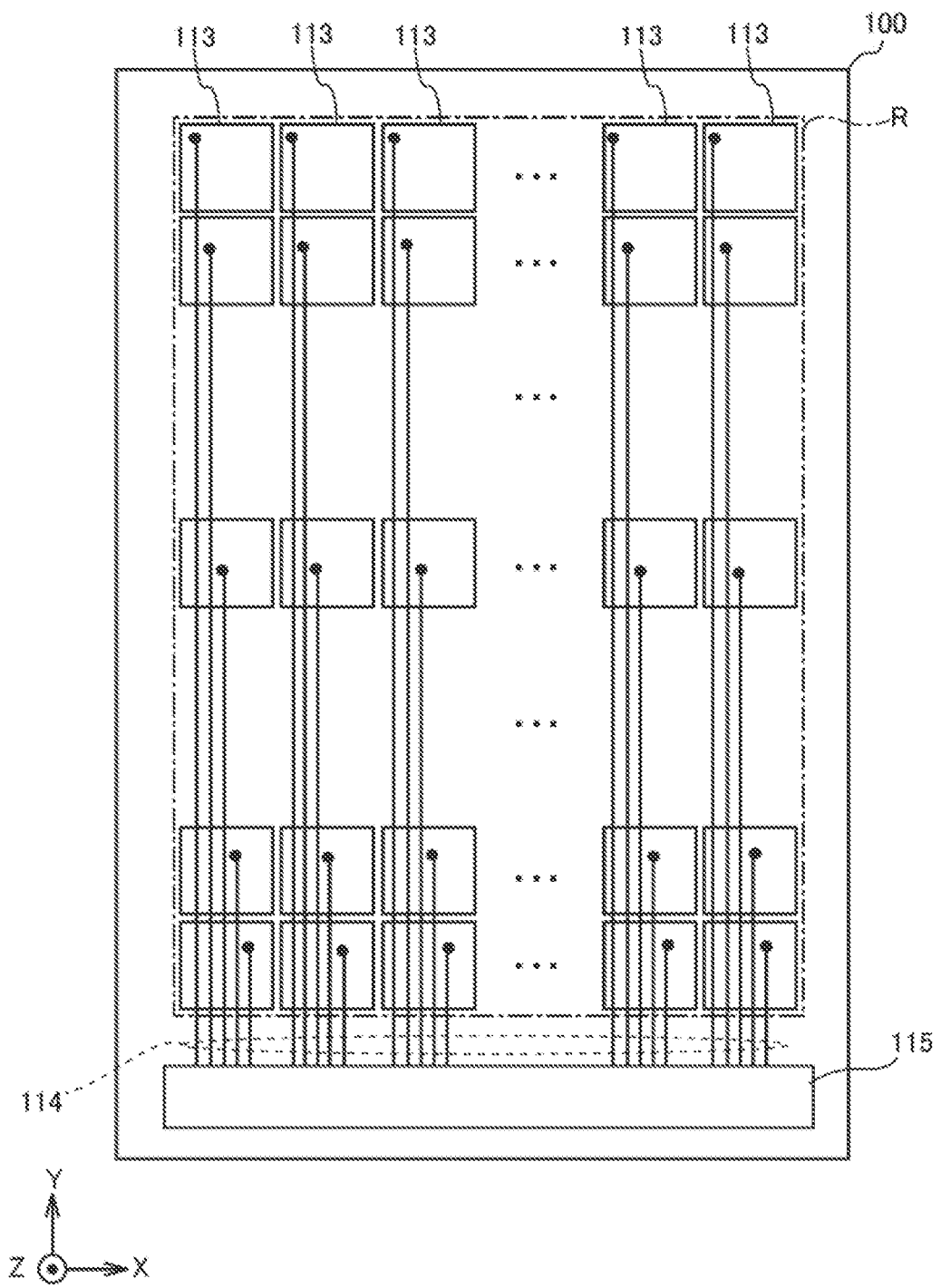
FIG. 8 is a schematic diagram illustrating an arrangement example of a counter electrode provided in the active matrix substrate.

Next, an arrangement and a configuration of the counter electrode 113 will be described. FIG. 8 is a schematic diagram illustrating an arrangement example of the counter electrode 113 provided in the active matrix substrate 110. As illustrated in FIG. 8, the plurality of counter electrodes 113 are arranged in a matrix in a display region R. One counter electrode 113 overlaps the plurality of pixels PIX in the plan view. Further, the plurality of counter electrodes 113 are connected to one sensor wiring line 114 that is different from each other.

Each sensor wiring line 114 is connected to a controller 115 provided on the substrate 100. The controller 115 controls a potential of the counter electrode 113 via the sensor wiring line 114.

Further, although not illustrated, the active matrix substrate 110 includes a display control circuit, a gate driver, and a source driver. The display control circuit supplies a control signal such as a synchronization signal (vertical synchronization signal, horizontal synchronization signal) indicating timing for writing a clock signal and an image to the gate driver and the source driver. The gate driver sequentially applies a scanning voltage to the plurality of gate lines GL. The source driver applies a data voltage indicating a gray scale of a display image to the data line SL, based on a control signal.

When an image is displayed, the controller 115 applies a constant voltage to all of the counter electrodes 113 and, when touch detection is performed, the controller 115 applies a pulse voltage for touch detection to all of the counter electrodes 113. The display device 1A performs image display and touch detection in a time division manner in one frame period.

In a state where a finger of the user does not contact the touch surface, each of the counter electrodes 113 has a parasitic capacitance. When the finger contacts the touch surface, the capacitance is formed between the counter electrode 113 and the finger 2 near the contact position, and thus the capacitance in the counter electrode 113 changes. Then, a sense signal according to the capacitance in the counter electrode 113 is output to the controller 115 via the sensor wiring line 114.

Referring back to FIG. 5, the counter substrate 120 includes a plurality of color filters (not illustrated) of each color of red (R), green (G), and blue (B) arranged so as to overlap each of the pixels PIX (see FIG. 6 and the like) in the display region in the plan view. The pixel PIX corresponds to color of any of red (R), green (G), blue (B). Further, the counter substrate 120 includes a black matrix (not illustrated) between the pixels PIX adjacent to each other and in a region other than the pixel PIX.

Figure 9A:
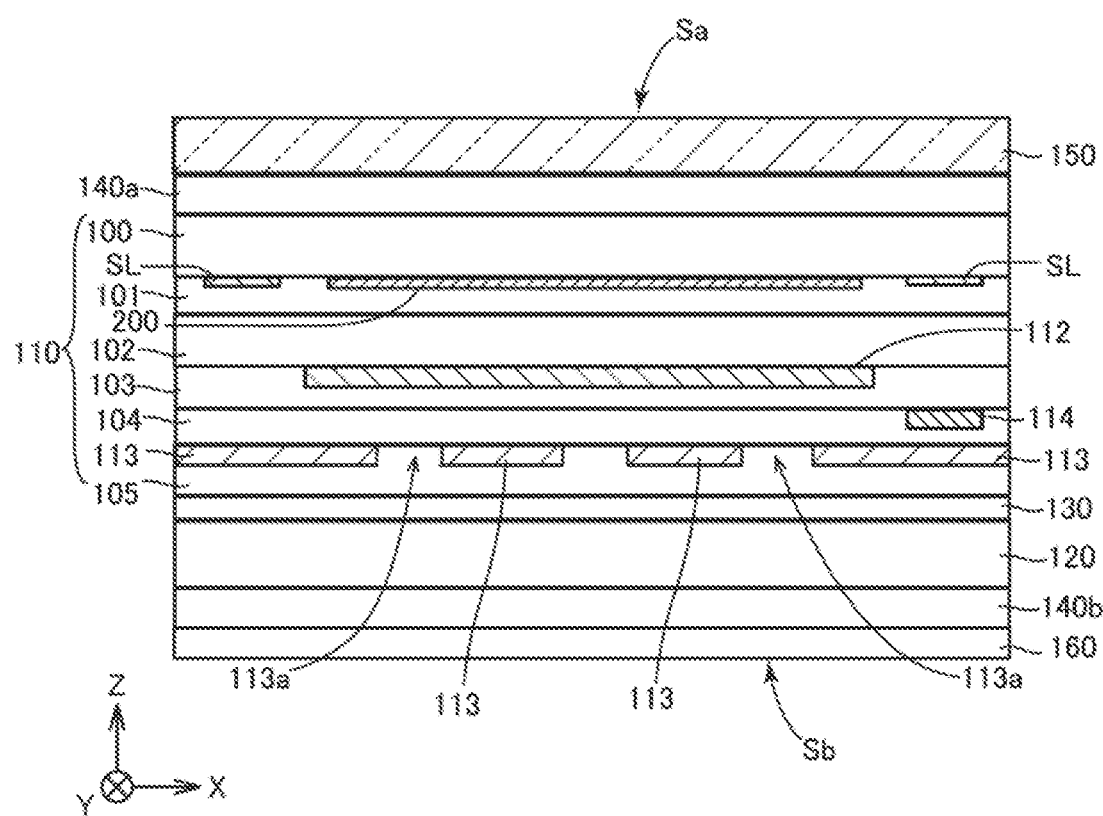
FIG. 9A is a schematic cross-sectional view illustrating the display device taken along a line B-B in FIG. 6.
Figure 9B:
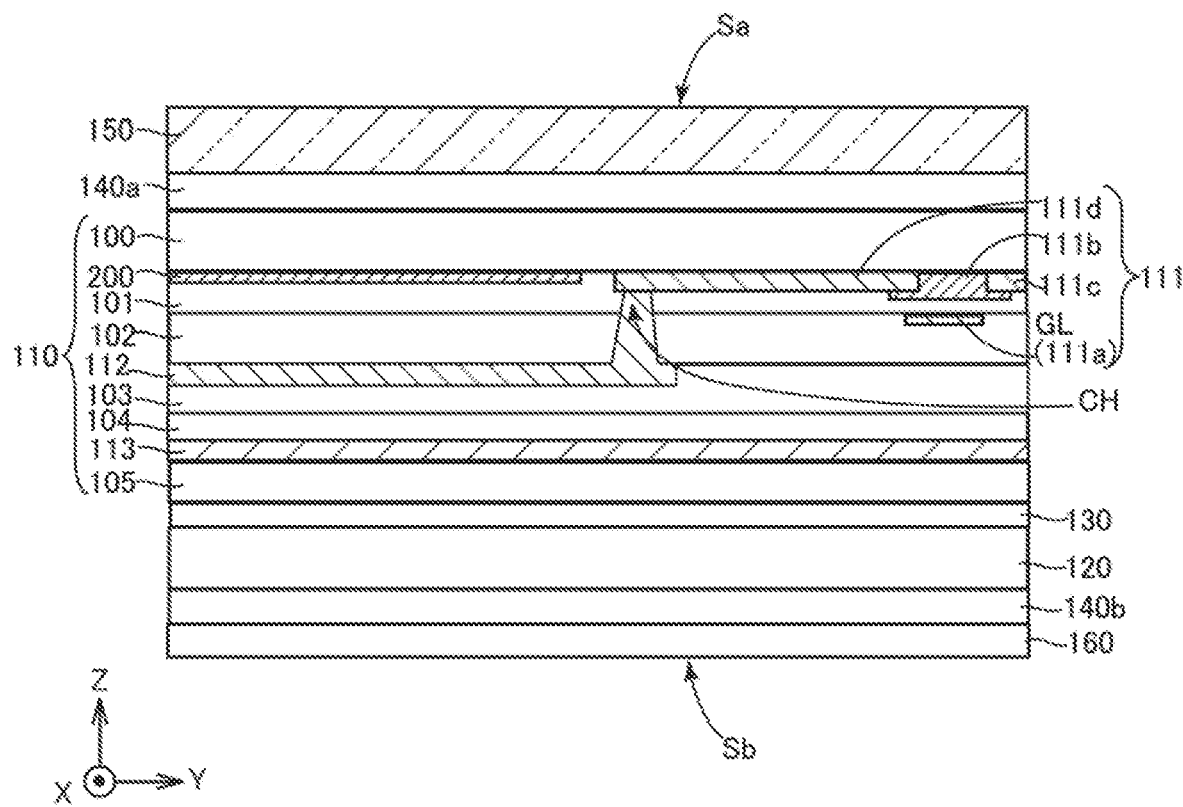
FIG. 9B is a schematic cross-sectional view illustrating the display device taken along a line C-C in FIG. 6.

Herein, a schematic cross-sectional view of the display device 1A is illustrated in each of FIGS. 9A and 9B. FIGS. 9A and 9B are the schematic cross-sectional views of the display device 1A taken along a line B-B and a line C-C in FIG. 6. Hereinafter, a cross-sectional configuration of the active matrix substrate 110 will be mainly described.

As illustrated in FIGS. 9A and 9B, the data line SL, a source 111c, a drain 111d, and a semiconductor layer 111b of the TFT 111, and the floating electrode 200 are provided on the substrate 100 in the active matrix substrate 110. The semiconductor layer 111b is disposed so as to overlap a part of the source 111c and the drain 111d.

The substrate 100 is formed of a material such as glass having insulating properties and translucency.

The floating electrode 200 and the semiconductor layer 111b are formed of the same material. In the present embodiment, the floating electrode 200 and the semiconductor layer 111b may be formed of, for example, an oxide semiconductor containing indium (In), gallium (Ga), zinc (Zn), and oxygen (O).

The data line SL, the source 111c, and the drain 111d are formed of the same material. In the present embodiment, the data line SL, the source 111c, and the drain 111d may be formed of a metal material such as copper (Cu) and aluminum (Al), for example.

An insulating film 101 is provided on the data line SL, and the source 111c, the drain 111d, and the semiconductor layer 111b of the TFT 111, and the floating electrode 200, and the gate line GL and a gate 111a of the TFT 111 connected to the gate line GL are provided on the insulating film 101. The gate 111a is provided in a position that overlaps the semiconductor layer 111b in the plan view. In the present embodiment, the gate line GL and the gate 111a may be formed of a metal material such as tantalum (Ta) and aluminum (Al), for example.

As illustrated in FIG. 9B, an insulating film 102 is provided on the gate line GL and the gate 111a. A contact hole CH extending through the insulating films 101 and 102 is formed in a position that overlaps the drain 111d in the plan view.

The pixel electrode 112 is provided on the insulating film 102, and the pixel electrode 112 and the drain 111d are connected to each other through the contact hole CH. In the present embodiment, the pixel electrode 112 may be formed of a transparent conductive film such as ITO, for example.

As illustrated in FIGS. 9A and 9B, an insulating film 103 is provided on the pixel electrode 112. Then, as illustrated in FIG. 9A, the sensor wiring line 114 is provided on the insulating film 103 in a position that overlaps the data line SL in the plan view. The sensor wiring line 114 may be formed of a metal material such as copper (Cu) and aluminum (Al).

As illustrated in FIGS. 9A and 9B, an insulating film 104 is provided on the sensor wiring line 114, and the counter electrode 113 is provided on the insulating film 104. As illustrated in FIG. 9A, the counter electrode 113 has the plurality of slits 113a in positions that overlap the pixel electrode 112 in the plan view. In the present embodiment, the counter electrode 113 may be formed of a transparent conductive film such as ITO, for example.

A flattening film 105 is provided on the counter electrode 113, and the liquid crystal layer 130 is provided on the flattening film 105.

In FIGS. 9A and 9B, when the second surface Sb on the backlight 160 side is to be touched, a conductive member capacitively coupled to a finger of the user is not provided between the second surface Sb and the counter electrode 113. Thus, in this case, the capacitive coupling between the finger of the user and the counter electrode 113 is not weakened, and a sense signal according to the capacitance between the counter electrode 113 and the finger is output from the sensor wiring line 114. In other words, in this case, a member capacitively coupled to the finger of the user is not provided other than the counter electrode 113, and thus the touch detection accuracy is less likely to decrease.

When the first surface Sa on the cover glass 150 side is to be touched, the data line SL and the floating electrode 200 are provided in a layer closer to the first surface Sa than the counter electrode 113. Since the data line SL and the floating electrode 200 are disposed in positions closer to the first surface Sa than the counter electrode 113, capacitive coupling occurs between a finger of the user and the data line SL and between the finger of the user and the floating electrode 200.

In a case where the floating electrode 200 is not provided, the capacitive coupling between the finger of the user and the data line SL weakens a coupling capacitance between the counter electrode 113 and the finger of the user, and a capacitance change in the counter electrode 113 is reduced.

In the present embodiment, the floating electrode 200 is provided in a layer closer to the data line SL so as to overlap the counter electrode 113 in the plan view, and the counter electrode 113 overlaps the pixel electrode 112 and the floating electrode 200 in the plan view. Thus, the coupling capacitance between the counter electrode 113 and the finger of the user is a capacitance acquired by combining a capacitance between the counter electrode 113 and the pixel electrode 112, a capacitance between the pixel electrode 112 and the floating electrode 200, and a capacitance between the finger of the user and the floating electrode 200. In other words, the coupling capacitance between the counter electrode 113 and the finger of the user increases as compared to a case where the floating electrode 200 is not provided. As a result, even when the capacitive coupling occurs between the finger of the user and the data line SL, a capacitance change in the counter electrode 113 is less likely to be reduced, and the touch detection accuracy improves.

Third Embodiment

In the second embodiment, the TFT 111 having the top gate structure is exemplified as a switching element provided in a pixel, but the TFT 111 may have a bottom gate structure in which the gate 111a is provided closer to the substrate 100 side than the source 111c and the drain 111d.

Figure 10A:
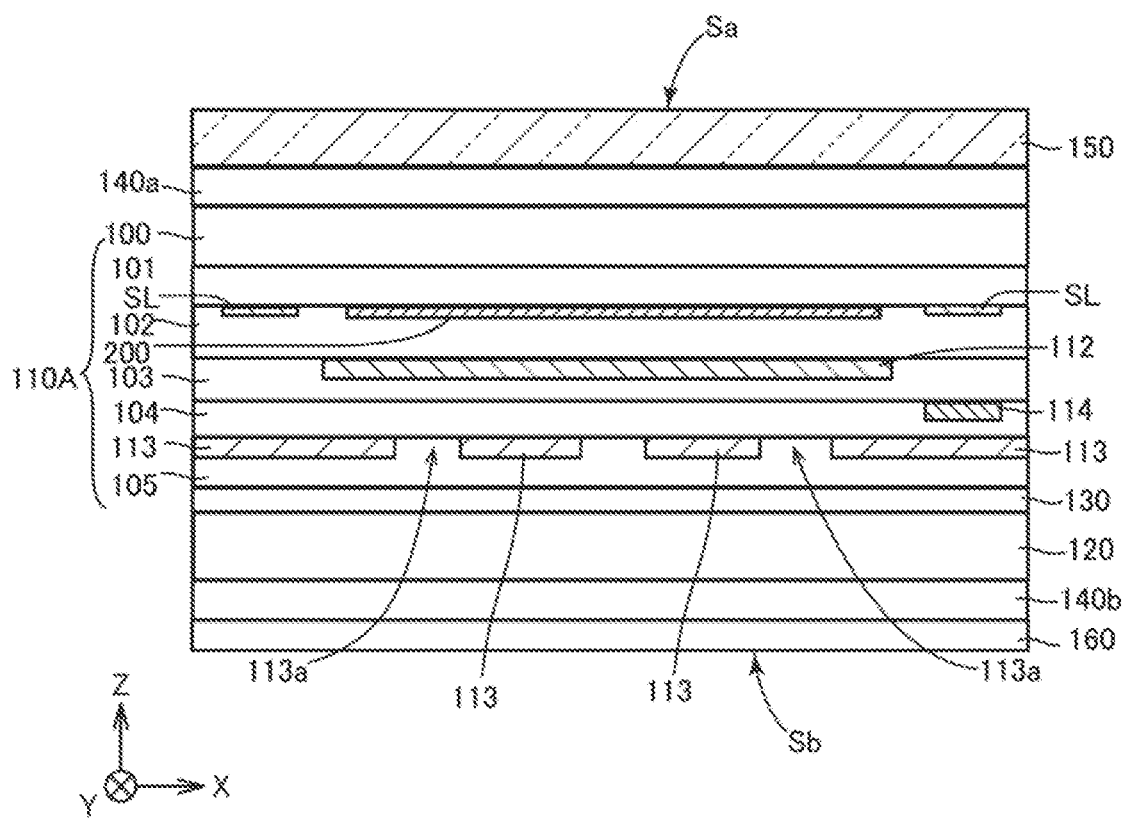
FIG. 10A is a schematic cross-sectional view illustrating a display device according to a third embodiment.
Figure 10B:
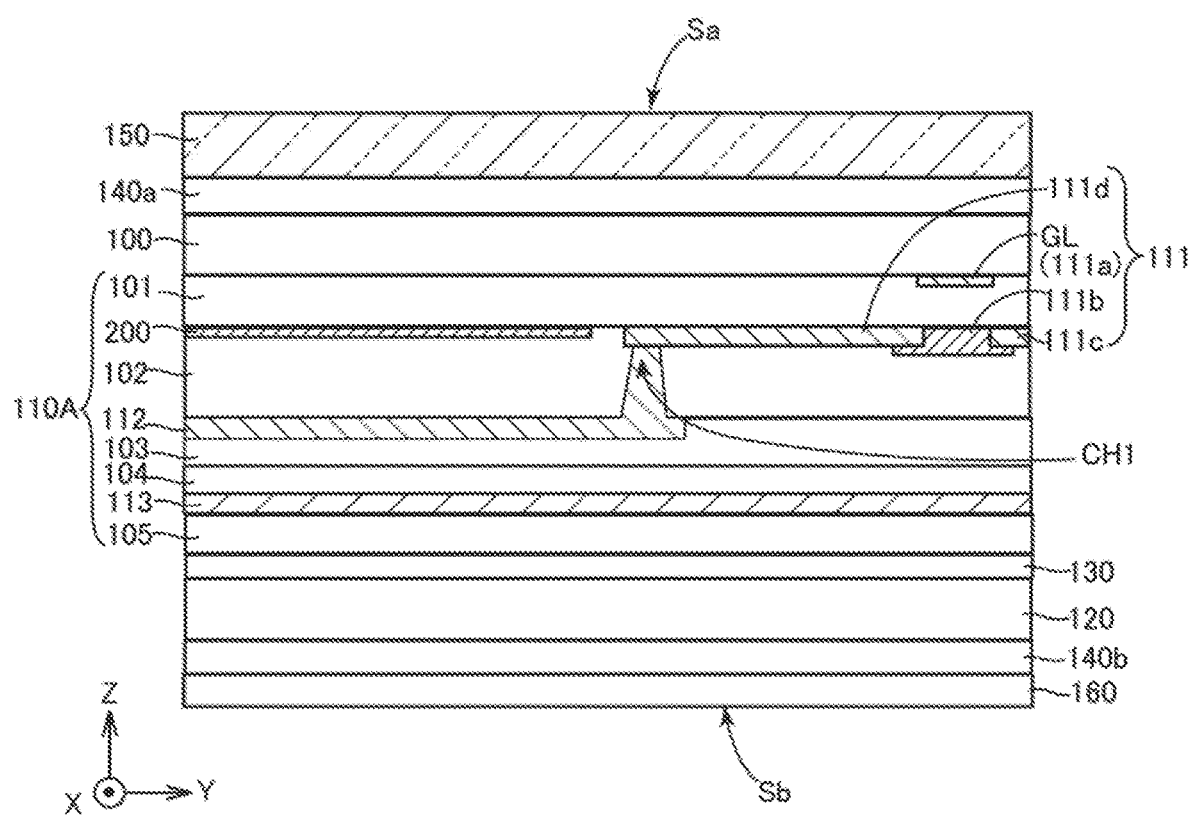
FIG. 10B is a schematic cross-sectional view illustrating the display device according to the third embodiment, and illustrates a schematic cross-section of a portion different from that in FIG. 10A.

FIGS. 10A and 10B are schematic cross-sectional views of a display device according to the present embodiment, and FIG. 10A illustrates a cross section of a portion taken along a line B-B illustrated in FIG. 6, i.e., an opening of a pixel being cut in an X-axis direction between a data line SL and a data line SL adjacent to each other. FIG. 10B illustrates a cross section of a portion taken long a line C-C illustrated in FIG. 6, i.e., a TFT being cut in a Y-axis direction. In FIGS. 10A and 10B, the same configurations as those in the second embodiment are denoted with the same reference signs as those in the second embodiment. Now, a structure different from that in the second embodiment will be mainly described.

As illustrated in FIG. 10B, in an active matrix substrate 110A, a gate line GL and a gate 111a of a TFT 111 are provided in contact with a substrate 100. As illustrated in FIGS. 10A and 10B, an insulating film 101 is provided on the gate 111a, and a data line SL, a source 111c, a drain 111d, a semiconductor layer 111b, and a floating electrode 200 are provided on the insulating film 101. The semiconductor layer 11b is disposed in a position that overlaps the gate 111a in a plan view. The floating electrode 200 is formed, similarly to the second embodiment, of the same material as that of the semiconductor layer 111b.

An insulating film 102 is provided on the data line SL, the source 111c, the drain 111d, the semiconductor layer 111b, and the floating electrode 200, and a pixel electrode 112 is provided on the insulating film 102. A contact hole CH1 extending through the insulating film 102 is formed in a position that overlaps the drain 111d in the plan view, and the pixel electrode 112 and the drain 111d are connected to each other through the contact hole CH1.

Also, in the present embodiment, when a first surface Sa is to be touched, the floating electrode 200 is provided in a position that overlaps a counter electrode 113 in the plan view in a layer closer to the data line SL capacitively coupled to a finger of the user. For this reason, a coupling capacitance between the counter electrode 113 and the finger is increased as compared to a case where the floating electrode 200 is not provided. Thus, capacitive coupling between the finger of the user and the counter electrode 113 is less likely to be weakened by capacitive coupling between the finger of the user and the data line SL, and the touch detection accuracy improves.

Embodiments of the disclosure have been described above, but the embodiments described above are merely examples for implementing the disclosure. Thus, the disclosure is not limited to the embodiments described above, and can be carried out by appropriately modifying the embodiments described above without departing from the scope. Now, modified examples of the above-described embodiments are given.

(1) In the second and third embodiments described above, an example is described in which the floating electrode is formed of the same material as that of the semiconductor layer 111b in the layer in which the semiconductor layer 111b of the TFT 111 is formed, but the layer in which the floating electrode is formed and the material thereof are not limited thereto.

For example, depending on an orientation of the liquid crystal molecules in the liquid crystal layer 130, a dark line in which a transmittance decreases may be generated in the slit 113a of the counter electrode 113. In this case, the floating electrode may be formed discontinuously only in a region in which the dark line is generated, i.e., a portion that overlaps the slit 113a (see FIGS. 9A and 10A). The floating electrode may be formed of the same material as that of the data line SL in the layer in which the data line SL is formed.

(2) In the third embodiment described above, an example is described in which, when the first surface Sa is to be touched, the floating electrode 200 is formed on the insulating film 101 provided with the data line SL capacitively coupled to the finger of the user, but the arrangement of the floating electrode 200 in this case is not limited thereto. When the floating electrode is provided in a position closer to the first surface Sa, a coupling capacitance between the counter electrode 113 and the finger of the user further increases. Thus, in FIG. 10A, the floating electrode 200 may be provided in contact with the substrate 100.

(3) In the second and third embodiments described above, an example of the display device 1A is described including a first mode in which an image is visually recognized from the first surface Sa side and a touch operation is received on the first surface Sa, and a second mode in which an image is visually recognized from the second surface Sb side and a touch operation is received, but the display device 1A may include only the first mode.

The display device described above can be described as follows.

A display device according to a first configuration is a display device configured to display an image and also detect a touch of a user, and includes: a plurality of touch detection electrodes disposed overlapping, in a plan view, a display region in which the image is displayed; a conductive member disposed in a position closer to a surface touched by the user than the plurality of touch detection electrodes; and a floating electrode that is disposed in a position closer to the surface touched by the user than the plurality of touch detection electrodes, overlaps at least a part of each of the plurality of touch detection electrodes in the plan view, and is disposed in a floating state.

According to the first configuration, the conductive member and the floating electrode are provided between the plurality of touch detection electrodes and the surface touched by the user where the plurality of touch detection electrodes overlap the display region in the plan view. The conductive member is disposed in the position closer to the surface touched by the user than the plurality of touch detection electrodes, and thus, when the finger of the user or the like comes into contact, capacitive coupling occurs between the conductive member and the finger of the user or the like. The floating electrode overlaps at least a part of each of the plurality of touch detection electrodes in the plan view in the position closer to the surface touched by the user than the plurality of touch detection electrodes. When the finger of the user or the like comes into contact, a coupling capacitance between the at least a part of each of the plurality of touch detection electrodes and the finger of the user or the like becomes a capacitance acquired by combining a capacitance between the at least a part of each of the plurality of touch detection electrodes and the floating electrode and a capacitance between the floating electrode and the finger of the user or the like, and further increases as compared to a case where the floating electrode is not provided. As a result, even when the capacitive coupling occurs between the finger of the user or the like and the conductive member, a capacitance change in each of the plurality of touch detection electrodes is less likely to be reduced, and the touch detection accuracy is less likely to decrease.

In the first configuration, the display device may include: a display panel in which the display region is formed; a touch panel provided on the display panel, the plurality of touch detection electrodes being formed in the touch panel; an antenna layer provided on the touch panel, a wireless communication antenna as the conductive member and the floating electrode being formed in the antenna layer; and a cover member that is provided on the antenna layer and has translucency, wherein a surface of the cover member may be the surface touched by the user, the wireless communication antenna may be formed in a mesh shape by using a metal fine line, and the floating electrode may be formed on the antenna layer in a region that does not overlap the metal fine line in a plan view (second configuration).

According to the second configuration, in the display device, the touch panel is provided on the display panel, the antenna layer is provided on the touch panel, and the cover member is provided on the antenna layer. The antenna layer is provided with the mesh-shaped wireless communication antenna formed of the metal fine line, and the surface of the cover member is touched by the user. Thus, when the finger of the user or the like contacts the cover member surface, capacitive coupling occurs between the finger of the user or the like and the wireless communication antenna. However, since the floating electrode is formed in the region that does not overlap the metal fine line of the wireless communication antenna in the plan view, a coupling capacitance between the touch detection electrode and the finger of the user or the like is a capacitance acquired by combining a capacitance between the touch detection electrode and the floating electrode and a capacitance between the floating electrode and the finger of the user or the like. Thus, even when the capacitive coupling occurs between the finger of the user or the like and the wireless communication antenna, a capacitance change in each of the plurality of touch detection electrodes is less likely to be reduced, and the touch detection accuracy is less likely to decrease.

In the first configuration, the display device may include an active matrix substrate including the display region, wherein the active matrix substrate may include a substrate, a plurality of pixel electrodes disposed on one of surfaces of the substrate, the plurality of touch detection electrodes overlapping the plurality of pixel electrodes in the plan view, and the conductive member disposed in a position that does not overlap the plurality of pixel electrodes in the plan view, a first voltage may be applied to the plurality of touch detection electrodes when the image is displayed, a second voltage different from the first voltage may be applied to the plurality of touch detection electrodes when a touch of the user is detected, and the plurality of touch detection electrodes may output a sense signal according to a capacitance change in each of the plurality of touch detection electrodes, and the display device may have a first touch surface that is provided on a side opposite to the one of surfaces of the active matrix substrate and is touched by the user (third configuration).

According to the third configuration, the display device includes the active matrix substrate. The plurality of pixel electrodes, the conductive member, and the plurality of touch detection electrodes are provided above the one of surfaces of the substrate in the active matrix substrate. The plurality of touch detection electrodes are used for image display and touch detection, and output a sense signal according to a capacitance change in each of the plurality of touch detection electrodes during the touch detection. The display device includes the first touch surface that is provided on the side opposite to the one of surfaces of the substrate in the active matrix substrate and is touched by the user. The conductive member and the floating electrode are disposed in positions closer to the first touch surface than the plurality of touch detection electrodes. When the second surface is touched, capacitive coupling occurs between the finger of the user or the like and the conductive member and between the finger of the user or the like and the floating electrode, and thus, even when the capacitive coupling occurs between the finger of the user or the like and the conductive member, a capacitance change in each of the plurality of touch detection electrodes is less likely to be reduced, and the touch detection accuracy is less likely to decrease.

In the third configuration, the display device may further include: a second touch surface that is provided on a side of the one of surfaces of the active matrix substrate and is touched by the user; and a control circuit configured to switch a mode to any one of modes of a first mode in which the first touch surface is touched and a second mode in which the second touch surface is touched, and display the image according to the switched mode (fourth configuration).

According to the fourth configuration, the display device includes the first touch surface and the second touch surface on a side opposite to the first touch surface across the active matrix substrate. The user can perform a touch operation while visually recognizing an image according to a mode of any one of the first mode in which the first touch surface is touched and the second mode in which the second touch surface is touched.

In the third or fourth configuration, the active matrix substrate may include, as the conductive member, a plurality of data lines formed on the one of surfaces of the substrate, and the floating electrode may overlap, in the plan view, each of the plurality of pixel electrodes between a data line and an adjacent data line (fifth configuration).

In the third or fourth configuration, the active matrix substrate may include a plurality of switching elements connected to the plurality of pixel electrodes on the one of surfaces of the substrate, the plurality of switching elements may each include a semiconductor layer, and the floating electrode may be formed of the same material as that of the semiconductor layer in a layer in which the semiconductor layer is formed (sixth configuration).

According to the sixth configuration, the floating electrode can be manufactured in the step of forming the semiconductor layer of the switching element, and thus the steps can be reduced as compared to a case where the floating electrode is separately manufactured.

In the fifth configuration, the display device may include a liquid crystal layer provided on the active matrix substrate, the plurality of touch detection electrodes may each have a plurality of slits, a dark line depending on an orientation of liquid crystal molecules in the liquid crystal layer may be formed in a region in which the plurality of slits are formed, and the floating electrode may be formed of the same material as that of each of the plurality of data lines in a region in which the plurality of slits are formed in a layer in which the plurality of data lines are formed (seventh configuration).

According to the seventh configuration, the dark line depending on the orientation of the liquid crystal molecules is formed in a part of the slits provided in the plurality of touch detection electrodes, and thus, even when the floating electrode is provided in the region in which the dark line is formed, a transmittance of a pixel is less likely to decrease. Further, the floating electrode can be manufactured in the step of forming the data line, and thus the steps can be reduced as compared to a case where the floating electrode is separately manufactured.

In the seventh configuration, each of the plurality of switching elements may include a gate formed in a layer closer to the substrate than a source and a drain (eighth configuration).

In the seventh configuration, each of the plurality of switching elements may include a source and a drain formed in a layer closer to the substrate than a gate (ninth configuration).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A display device configured to display an image and also detect a touch of a user, the display device comprising:
   a plurality of touch detection electrodes disposed overlapping, in a plan view, a display region in which the image is displayed;
   a conductive member disposed in a position closer to a surface touched by the user than the plurality of touch detection electrodes;
   a floating electrode that is disposed in a position closer to the surface touched by the user than the plurality of touch detection electrodes, overlaps at least a part of each of the plurality of touch detection electrodes in the plan view, and is disposed in a floating state; and
   an active matrix substrate including the display region, wherein the active matrix substrate includes
   a substrate,
   a plurality of pixel electrodes disposed on one of surfaces of the substrate,
   the plurality of touch detection electrodes disposed overlapping the plurality of pixel electrodes in the plan view, and
   the conductive member disposed in a position that does not overlap the plurality of pixel electrodes in the plan view,
   wherein a first voltage is applied to the plurality of touch detection electrodes when the image is displayed, a second voltage different from the first voltage is applied to the plurality of touch detection electrodes when a touch of the user is detected, and the plurality of touch detection electrodes output a sense signal according to a capacitance change in each of the plurality of touch detection electrodes,
   the display device includes a first touch surface that is provided on a side opposite to the one of surfaces of the substrate and is touched by the user,
   the active matrix substrate includes, as the conductive member, a plurality of data lines formed on the one of surfaces of the substrate, and
   the floating electrode overlaps, in the plan view, each of the plurality of pixel electrodes between a data line and an adjacent data line,
   wherein the display device further includes a liquid crystal layer provided on the active matrix substrate,
   the plurality of touch detection electrodes each include a plurality of slits,
   a dark line depending on an orientation of liquid crystal molecules in the liquid crystal layer is formed in a region in which the plurality of slits are formed, and
   the floating electrode is formed of a same material as that of each of the plurality of data lines in a region in which the plurality of slits are formed in a layer in which the plurality of data lines are formed.

2. The display device according to claim 1 further comprising:
   a second touch surface that is provided on a side of the one of surfaces of the substrate and is touched by the user; and
   a control circuit configured to switch a mode to any one of modes of a first mode in which the first touch surface is touched and a second mode in which the second touch surface is touched, and display the image according to the switched mode.

3. The display device according to claim 1,
   wherein the active matrix substrate includes a plurality of switching elements connected to the plurality of pixel electrodes on the one of surfaces of the substrate, and
   wherein each of the plurality of switching elements includes a gate formed in a layer closer to the substrate than a source and a drain.

4. The display device according to claim 1,
   wherein the active matrix substrate includes a plurality of switching elements connected to the plurality of pixel electrodes on the one of surfaces of the substrate, and
   wherein each of the plurality of switching elements includes a source and a drain formed in a layer closer to the substrate than a gate.

* * * * *